US012050944B2

(12) United States Patent
Zhong et al.

(10) Patent No.: US 12,050,944 B2
(45) Date of Patent: Jul. 30, 2024

(54) NETWORK ATTACHED MPI PROCESSING ARCHITECTURE IN SMARTNICS

(71) Applicant: XILINX, INC., San Jose, CA (US)

(72) Inventors: Guanwen Zhong, Singapore (SG);
Chengchen Hu, Singapore (SG);
Gordon John Brebner, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 77 days.

(21) Appl. No.: 17/307,747

(22) Filed: May 4, 2021

(65) Prior Publication Data

US 2022/0358002 A1 Nov. 10, 2022

(51) Int. Cl.
*G06F 9/54* (2006.01)
*H04L 61/2521* (2022.01)
*H04L 69/22* (2022.01)

(52) U.S. Cl.
CPC .......... *G06F 9/546* (2013.01); *H04L 61/2525* (2013.01); *H04L 69/22* (2013.01)

(58) Field of Classification Search
CPC ...... G06F 9/546; H04L 61/2525; H04L 69/22
USPC ........................................................ 709/206
See application file for complete search history.

(56) References Cited

U.S. PATENT DOCUMENTS

| 2009/0178053 | A1* | 7/2009 | Archer | G06F 9/5072 718/105 |
| 2011/0258281 | A1* | 10/2011 | Archer | G06F 11/3404 709/212 |
| 2017/0255501 | A1* | 9/2017 | Shuler | G06F 9/546 |
| 2022/0229800 | A1* | 7/2022 | Kundu | H04L 45/028 |
| 2022/0231965 | A1* | 7/2022 | Kundu | H04L 47/30 |

OTHER PUBLICATIONS

William George, John Hagedorn, Judith Devaney, "Status Report on the Development of the Interoperable MPI Protocol", National Institute of Standards and Technology, 1999. (Year: 1999).*
Tork, Maroun, et al., "Lynx: A SmartNIC-driven Accelerator-centric Architecture for Network Servers", Proceedings of the Twenty-Fifth International Conference on Architectural Support for Programming Languages and Operating Systems, ACM< New York, NY, Mar. 9, 2020 (15 pages).
Hoefler, Torsten, et al., "sPIN: High-performance streaming processing in the Network", Proceedings of the International Conference for High Performance Computing, Networking, Storage and Analysis on, SC'17, Nov. 12-17, 2017 (16 pages).

* cited by examiner

*Primary Examiner* — Wing F Chan
*Assistant Examiner* — John Fan
(74) *Attorney, Agent, or Firm* — Patterson + Sheridan, LLP

(57) ABSTRACT

Embodiments herein describe a describe an interface shell in a SmartNIC that reduces data-copy overhead in CPU-centric solutions that rely on hardware compute engine (which can include one or more accelerators). The interface shell offloads tag matching and address translation without CPU involvement. Moreover, the interface shell enables the compute engine to read messages directly from the network without extra data copy—i.e., without first copying the data into the CPU's memory.

16 Claims, 11 Drawing Sheets

NETWORK ATTACHED MPI PROCESSING ARCHITECTURE IN SMARTNICS

TECHNICAL FIELD

Examples of the present disclosure generally relate to a Message Passing Interface (MPI) shell for smart network interface cards (SmartNICs).

BACKGROUND

The explosion of data and scale-out workloads/applications brings increasing scalability and performance challenges to modern data centers. To deliver low latency, high throughput, and low power consumption for modern applications, data centers often place their computing tasks in a distributed and networked setting. For example, the data center may include multiple nodes connected via a network where each node in the architecture includes a host with multi-core central processing units (CPUs) and hardware accelerators in the form of ASIC (Application Specific Integrated Circuit), FPGA (Field Programmable Gate Array), or GPU (Graphics Processing Unit).

MPI is widely deployed in many distributed applications across various domains such as scientific computing, genetic computing, and machine learning. It has been the de facto programming model for developing parallel and distributed computing for several decades. MPI offers various primitives such as point-to-point communication and collective and synchronization operations. Data communication (send/receive) among nodes is via the network. In traditional MPI applications with computation offloaded on accelerators, data received from the network is first stored in the host's memory and then copied to the memory of accelerators (hereafter referred to as device memory) for compute acceleration via the PCIe (Peripheral Component Interconnect Express) bus. After computation, results are usually copied again back to the host's memory. The overhead of several data copies makes this CPU-centric solution have significantly lower system performance and incur high latency. Put differently, when receiving a task from another node via the network, the CPU on the receiving node must first process the data and then send the data to memory corresponding to an accelerator in the node. Once finished, the accelerator transmits the data back to the CPU's memory before the node finally transmits the processed data to the requesting node. Thus, using accelerators in MPI environments can create significant overhead as the data is transmitted between the memories for the CPU and the accelerators.

SUMMARY

One embodiment describes a network interface card (NIC) that includes a Message Passing Interface (MPI) shell including circuitry configured to sniff packets received from a network to identify an MPI message, and forward data contained in the MPI message to a compute circuitry for processing without first copying the data contained in the MPI message into memory corresponding to a central processing unit (CPU). Further, the CPU is disposed in a same compute node as the NIC.

Another embodiment described herein is a NIC that includes a hardware compute circuitry and a MPI shell comprising circuitry configured to sniff packets received from a network to identify an MPI message, forward data contained in the MPI message to the compute circuitry for processing, and receive instructions from a CPU external to the NIC that instruct the compute circuitry to process the data contained in the MPI message.

Another embodiment described herein is a NIC that includes an interface shell comprising circuitry configured to sniff packets received from a network to identify a message corresponding to a distributed compute system where tasks are transmitted between nodes in the distributed compute system using messages and forward data contained in the message to a hardware compute circuitry for processing without first copying the data contained in the message into memory corresponding to a CPU. Further, the CPU is disposed in a same compute node as the NIC.

BRIEF DESCRIPTION OF DRAWINGS

So that the manner in which the above recited features can be understood in detail, a more particular description, briefly summarized above, may be had by reference to example implementations, some of which are illustrated in the appended drawings. R is to be noted, however, that the appended drawings illustrate only typical example implementations and are therefore not to be considered limiting of its scope.

DETAILED DESCRIPTION

Figure 1:
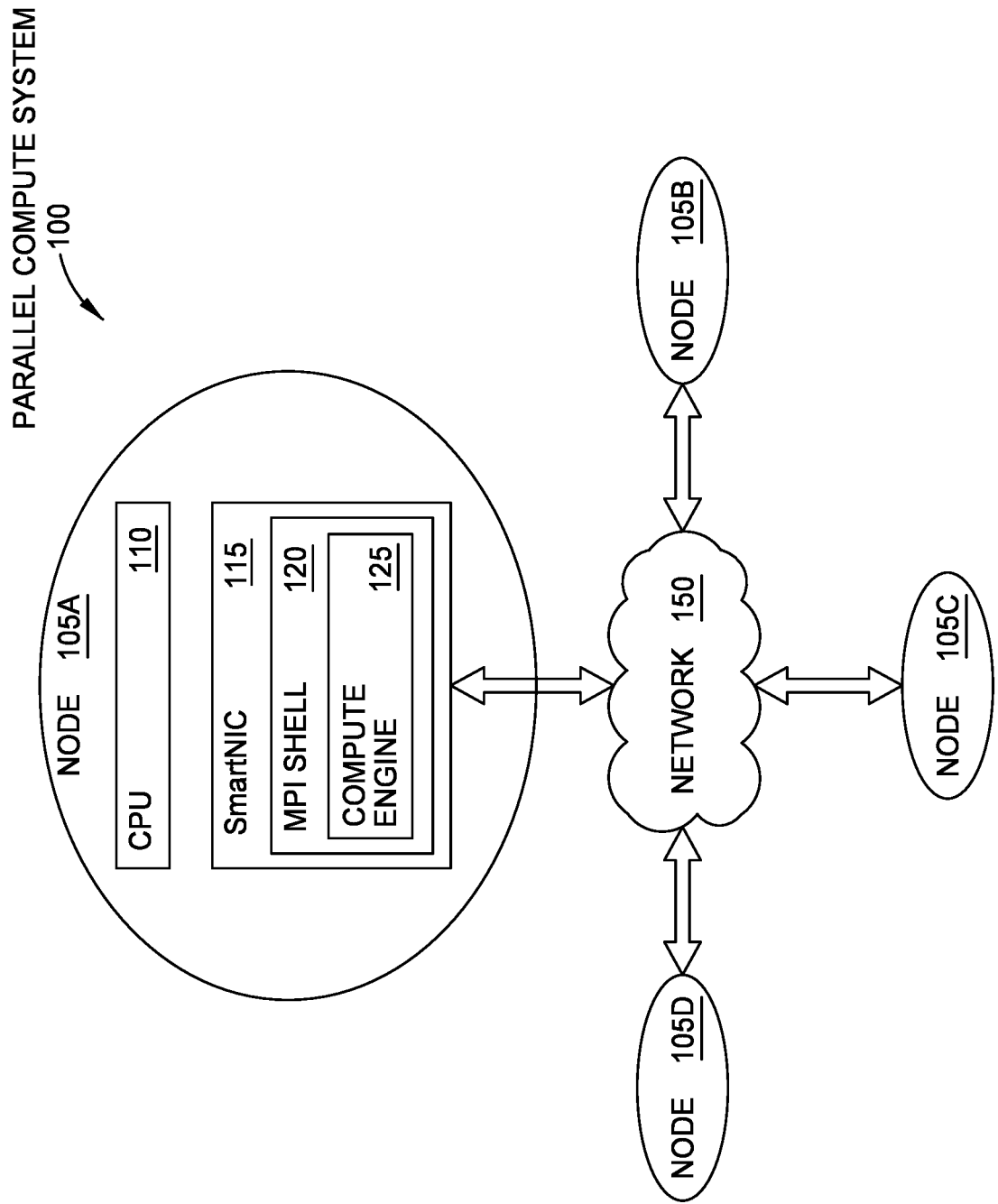
FIG. 1 illustrates a parallel compute system with SmartNICs that include MPI shells, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe an MPI shell in a SmartNIC that reduces data-copy overhead in CPU-centric solutions that rely on hardware accelerators. The MPI shell offloads tag matching and address translation without CPU involvement. Moreover, the MPI shell enables accelerators to read messages directly from the network without extra data copy—i.e., without first copying the data into the CPU's memory. Further, the MPI shell enables an MPI programming model to embrace network-centric data center architectures with SmartNICs, the MPI shell can be seamlessly integrated into the existing MPI libraries without extensive changes in applications, and the MPI shell brings data computation as near as possible (e.g., to an computer engine or accelerator on the SmartNIC) to achieve high performance, low latency, and low power consumption.

In one embodiment, the SmartNIC and compute engine can be designed on a single device such as an FPGA-based SmartNIC device. This kind of data center architecture targets high-speed (40 Gbps-200 Gbps) network and offers improved computational power due to its distributed adaptive computing feature. The intrinsic heterogeneity, scalability, and efficiency of the data center architecture make it tightly embrace modern distributed system applications demanding high performance, low latency, and low power consumption.

FIG. 1 illustrates a compute system 100 with SmartNICs that include MPI shells, according to an example. As shown, the compute system 100 (e.g., a parallel compute system) includes a plurality of nodes 105 that are interconnected via a network 150 (e.g., a local access network (LAN)). Each node 105 can include a CPU 110 and a SmartNIC 115, although the nodes 105 could include multiple CPUs (which can include multiple cores) and multiple SmartNICs 115. In one embodiment, the nodes 105 communicate using MPI, although the embodiments described herein can be expanded to include any distributed compute system where tasks are transmitted between the nodes 105.

In node 105A, the CPU 110 relies on the SmartNIC 115 to communicate with the network 150, and thus, to the other nodes 105. The SmartNIC 115 includes an MPI shell 120 that permits the SmartNIC 115 to "sniff" or "intercept" data transmitted to the node 105A from the other nodes 105 in the system 100. Instead of storing this data in memory corresponding to the CPU 110 (e.g., RAM), the CPU 110 can instruct the MPI shell 120 to instead process this data using an integrated compute engine 125 (which is also referred to as compute circuitry and can include one or more user-defined hardware accelerators). Once processed, the CPU 110 can instruct the SmartNIC 115 to then transmit the processed data to another node 105 using the network 150. Thus, the data (both the received data and the processed data) never has to be stored in the memory of the CPU 110. As such, the data write/read process bypasses the CPU and its corresponding memory complex.

In one embodiment, the compute engine 125 is separate from the SmartNIC 115. In that case, the MPI shell 120 can still provide MPI messages directly to the compute engine 125 for processing, receive the processed data from the compute engine 125, and forward the processed data to a different node 105 in the system 100 while bypassing the memory complex of the CPU 110. The CPU 110 can control this process using the MPI shell 120, but the MPI messages do not need to flow through the CPU 110 in order to reach the separate compute engine 125.

The MPI shell 120 and the compute engine 125 are hardware (e.g., circuitry) in the SmartNIC 115. In one embodiment, the MPI shell 120 and the compute engine 125 are implemented in programmable logic in an FPGA in the SmartNIC. In another embodiment, the MPI shell 120 and the compute engine 125 are implemented in an ASIC or System on Chip (SoC). In that case, the circuitry forming the MPI shell 120 and the compute engine 125 is hardened. In any case, the MPI shell 120 can be implemented in an integrated circuit in the SmartNIC 115, while the compute engine 125 may be implemented in the same integrated circuit or a different integrated circuit that is on the SmartNIC 115, or separate from the SmartNIC 115.

Figure 2:
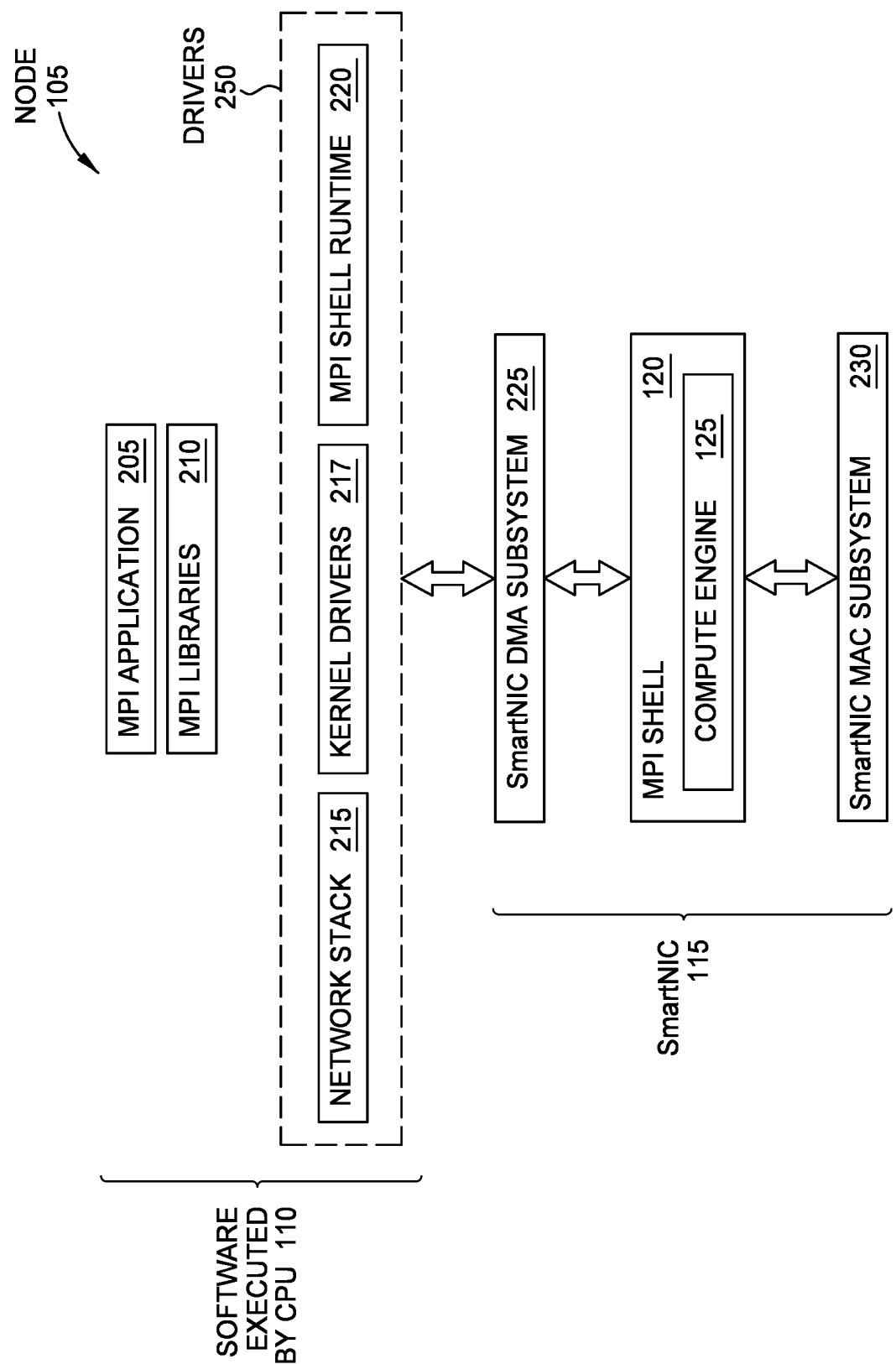
FIG. 2 is a block diagram of a node in a parallel compute system, according to an example.

FIG. 2 is a block diagram of a node in a parallel compute system, according to an example. In one embodiment, FIG. 2 illustrates the components within the nodes 105 in FIG. 1. In this example, the node 105 includes software executed by the CPU 110, which includes MPI applications 205, MPI libraries 210, and drivers 250. These drivers 250 include a network stack 215, kernel drivers 217, and an MPI shell runtime 220. The MPI applications 205 can include any application such as a scientific computing application, a genetic computing application, or a machine learning: artificial intelligence application. The MPI libraries 210 permit the MPI applications 205 to take advantage of a distributed computing environment (e.g., the compute system 100 in FIG. 1). The MPI libraries 210 can enable point-to-point communication and collective and synchronization operations between the nodes in the distributed computing environment.

The drivers 250 permit the MPI applications 205 and libraries 210 to communicate with the SmartNIC 115. The network stack 215 and kernel drivers 217 do not have to be changed or updated to perform the embodiments herein. However, the MPI shell runtime 220 is a new driver 250 that permits the CPU 110 and the software being executed on the CPU 110 (e.g., the MPI applications 205) to control and communicate with the MPI shell 120 in the SmartNIC 115. In one embodiment, the MPI shell runtime 220 is a software library used for device memory management and communication between the CPU 110 and the MPI shell 120, such as controlling the compute engine 125 as discussed below. For memory management of device memory (i.e., the local memory used by the compute engine 125), the MPI shell runtime 220 allocates message buffers physically located in device memory for hardware processes and deallocate buffers when a hardware process finishes its lifecycle. It can be implemented with various memory management algorithms such as fixed-size-block allocation, buddy memory allocation, and slab allocation. Although the MPI shell runtime 220 is shown as being separate from the MPI shell 120, it can be considered as part of the MPI shell, where the runtime 220 is a software portion of the shell while the hardware portion of the shell is disposed in the SmartNIC 115.

The SmartNIC 115 includes a SmartNIC Direct Memory Access (DMA) subsystem 225 that interfaces with the software executing in the CPU 110 and a SmartNIC Media Access Control (MAC) subsystem 230. The discussion below refers generally to "the host" which can include the CPU 110 in the same node as the SmartNIC 115, and the software executed by the CPU 110.

Focusing on a typical MPI implementation, the MPI standard generally uses two-sided communication that includes a sender (e.g., MPI_send) and a receiver (MPI_rcv). At the sender side, a CPU in a first node prepares a message with its header and data for transmission over a communication channel using a transport protocol such as TCP/IP, RoCE (Remote Direct Memory Access over Converged Ethernet) or iWARP, and sends messages to the receiver over the communication channel. At the receiver side, a CPU in a second node extracts the message header and data from the communication channel and stores them in a temporary buffer, performs operations referred to as tag matching to check whether an incoming message matches a receive request posted by the receiver, and copies the message to a destination receive buffer.

Where the nodes have the MPI shell 120 integrated into the SmartNIC 115, MPI processes can be separated into hardware and software processes. A hardware process indicates that there is a hardware compute engine 125 on the SmartNIC, or attached thereto, that will perform the process, while a software process is a traditional MPI process which is performed only on the CPU 110. Each process has a unique number, rank, as its identifier. For any two-sided communication among software and hardware processes, it can be classified into four examples as below:

Example A: If a sender and a receiver are software processes, the system leverages the traditional MPI communication flows mentioned above without any changes. That is, the communications pass through the MPI shell 120 without being affected by the shell 120.

Example B: If the sender is a software process but the receiver is a hardware process, the system leverages the traditional MPI send operations mentioned above without any changes. At the receiver side, however, the MPI shell 120 sniffs/filters packets of messages related to hardware processes directly from the SmartNIC MAC subsystem 230 and stores data into destination receive buffers located at the device memory (i.e. local accelerator or compute engine memory). Tag matching and address translation are offloaded onto the MPI shell 120 without CPU involvement (which is discussed in more detail below). When a message is completely received and stored in the device memory, the MPI shell 120 notifies the host at the receiver end—e.g., the MPI application 205 executing in the CPU 110. When all messages are ready, the host issues a compute command with message addresses as arguments to the specific hardware compute engine 125 for computation. The compute engine 125 then reads messages from its device memory, starts computation, writes back results to the device memory if applicable, and notifies the host (e.g., the MPI application 205) after finishing.

Example C: If the sender is a hardware process but the receiver is a software process, at the receiver end, receive operations are the same as the traditional MPI receive operations mentioned above. At the sender side, however, the host uses the SmartNIC DMA subsystem 225 to notify transmission (TX) logic in the SmartNIC 115 of message addresses if messages are stored in the device memory. The TX logic then reads messages via a Data Controller in the MPI Shell (which is discussed in detail in FIGS. 3 and 9) and sends data to a remote receiver. If messages are stored in the host-side memory, then send operations are the same as the traditional MPI operations.

Example D: If both the sender and receiver are hardware processes, at the receiver end, it follows operations mentioned in Example B. At the sender side, it follows operations mentioned in Example C.

Figure 3:
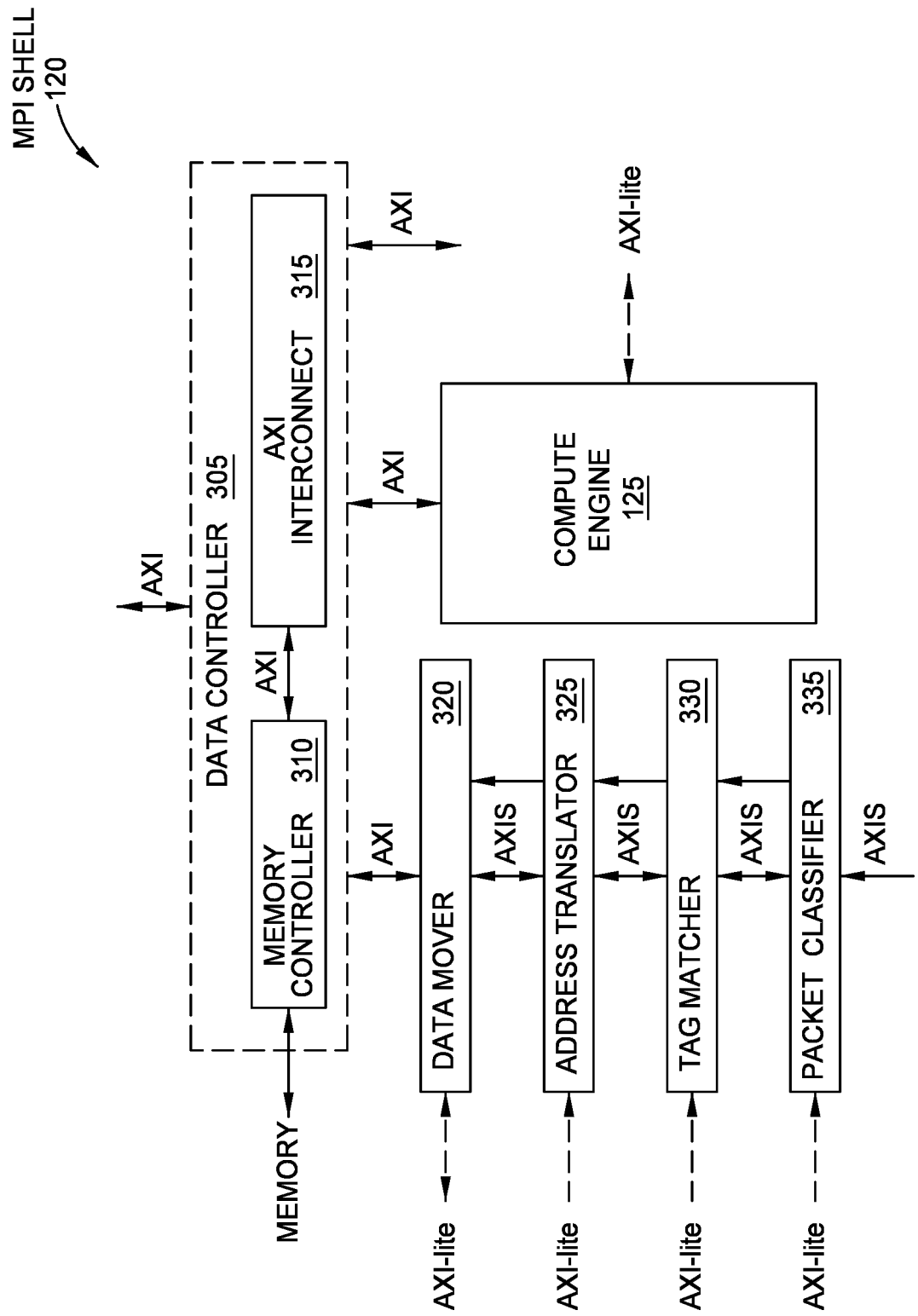
FIG. 3 is a block diagram of an MPI shell, according to an example.

FIG. 3 is a block diagram of an MPI shell 120, according to an example. Specifically, FIG. 3 illustrates the portions of the MPI shell 120 that reside on a SmartNIC. Although not shown, the MPI shell 120 can also include the MPI shell runtime (e.g., a software driver) that executes in the host (e.g., the MPI shell runtime 220 in FIG. 2).

The hardware of the MPI shell 120 includes a data controller 305, a data mover 320, an address translator 325, a tag matcher 330, a packet classifier 335, and the compute engine 125. Each of these hardware elements (e.g., circuits) are discussed in more detail in the figures that follow. However, as a brief introduction, the packet classifier 335 filters (or identifies) received packets related to MPI message and generates metadata for those packets. This metadata is then used by the downstream hardware elements in the MPI shell 120. Although not shown, the packet classifier 335 can receive the packets from the SmartNIC MAC subsystem 230 in FIG. 2, which in turn receives the packets from the network.

The tag matcher 330 matches incoming messages from a source process with receive requests posted in a destination process. The address translator 325 calculates the destination address in memory (e.g., local memory in the SmartNIC) for an incoming MPI message packet and tracks of the readiness of the message. The data mover 320 converts packets in the form of Advanced eXtensible Interface Streaming (AXIS) protocol into data in the form of AXI protocol and issues interrupt or pulling signals to the local host (e.g., the local CPU and MPI application) when MPI messages are completely received. The data controller 305 performs arbitration for various hardware elements in the MPI shell 120 to share and access memory in the SmartNIC. The compute engine 125 can perform any accelerator function on the data in the MPI messages. As discussed above, the compute engine 125 can be implemented using programmable or hardened logic.

Figure 4:
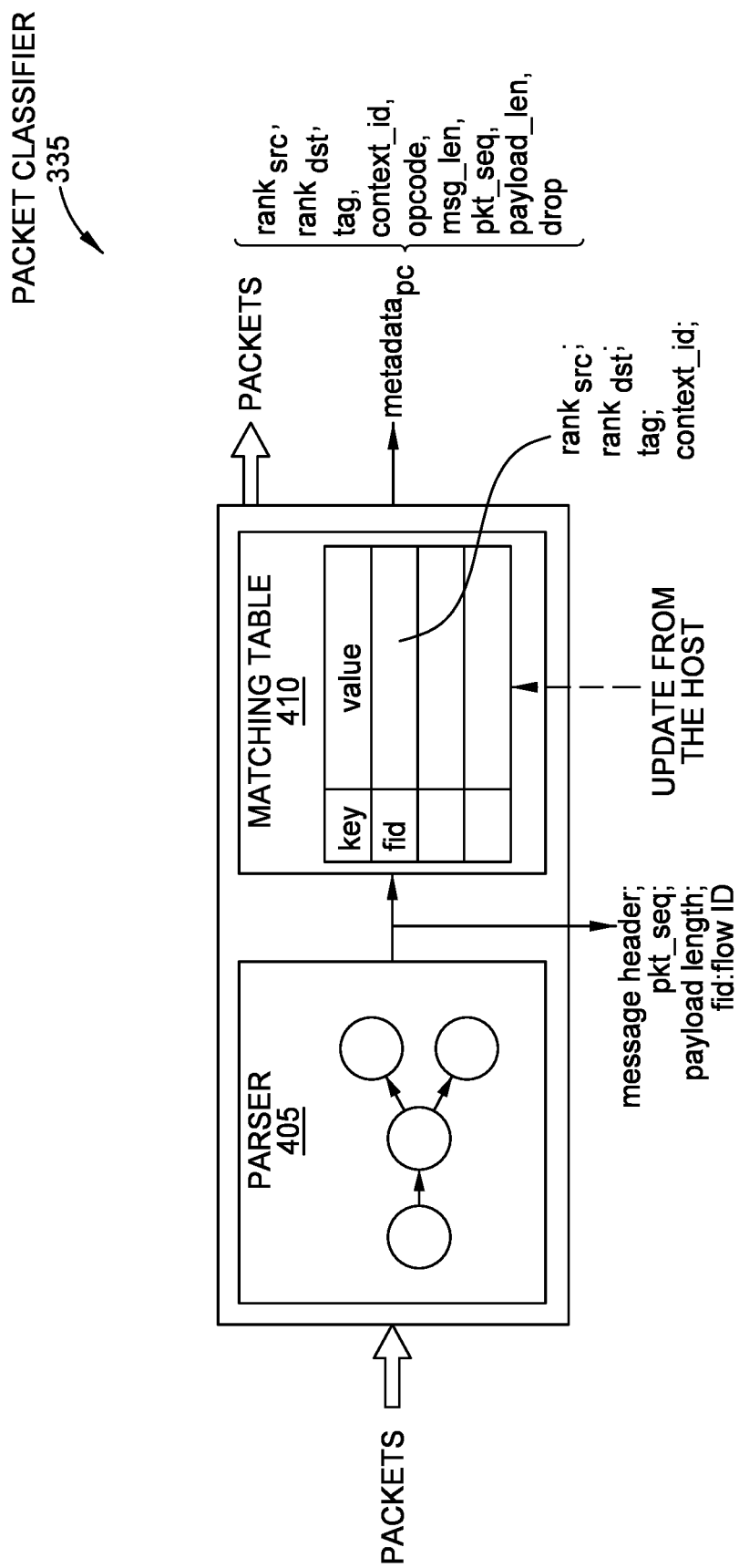
FIG. 4 illustrates a packet classifier in an MPI shell, according to an example.

FIG. 4 illustrates the packet classifier 335 in the MPI shell 120, according to an example. The packet classifier 335 includes a parser 405 and a matching table 410. In general, the packet classifier 335 filters packets related to MPI communication and generates metadata for those packets. Further, a table configuration in the MPI shell runtime 220 in FIG. 2 can write and delete entries in the matching table 410 in the packet classifier 335.

The parser 405 extracts information from an incoming packet. The information may include a message header, packet sequence number, payload length, and flow ID. In one embodiment, the message header contains <$rank_{src}$, $rank_{dst}$, tag, context_id, opcode, message length (msg_len)>, where an opcode is used to identify MPI operations such as send, receive, put, and get operations. The $rank_{src}$ and $rank_{dst}$ signals are unique identifiers of a source process and a destination process, respectively. A flow ID is used to classify packets and one example of a flow ID could be designed with <IP source address, IP destination address, protocol, source port, destination port>.

The matching table 410 receives a derived flow ID (fid) from the parser 405 as an input and searches for MPI communication information for the flow corresponding to the fid. The MPI communication information is defined by the $rank_{src}$, $rank_{dst}$, tag, and context Id. Entries of the matching table 410 are updated or written by a host (e.g., the local CPU) when the host and its remote peers finish their MPI hand-shaking process. An update/write operation can be implemented using an AXI-Lite interface. The matching table 410 can be implemented using hashing binary/ternary/semi-ternary content addressable memory (BCAM/TCAM/STCAM), etc.

The packet classifier 335 outputs $metadata_{pc}$ which includes <$rank_{src}$, $rank_{dst}$, tag, context_id, opcode, msg_len, pkt_seq, payload_len, drop>, where the drop signal is a miss signal from a lookup request to the matching table 410. That is, the drop is high when the matching table 410 was unable to find a flow corresponding to the fid received from the parser 405. When the drop signal is high, the corresponding packet is dropped by the SmartNIC.

Figure 5:
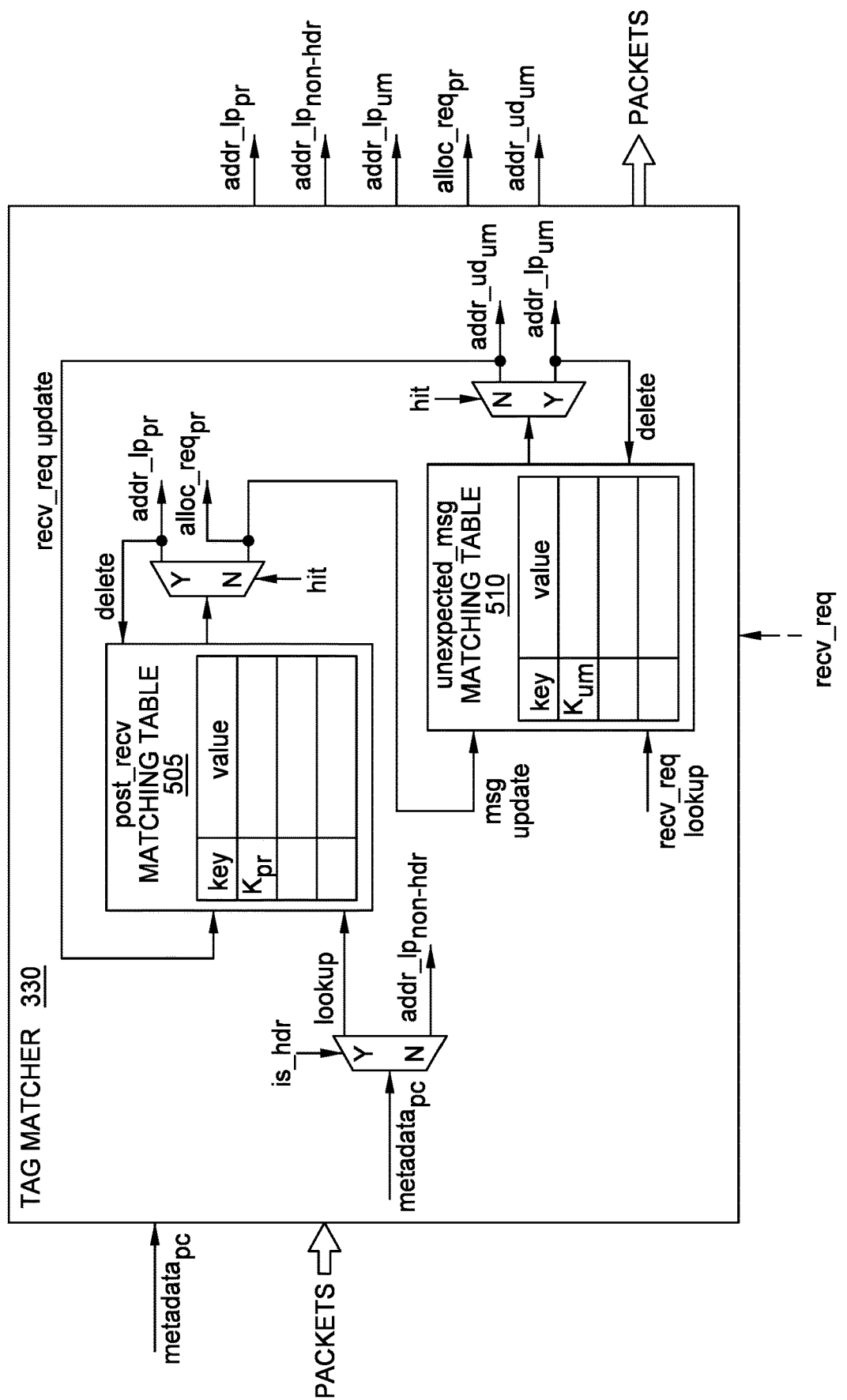
FIG. 5 illustrates a tag matcher in an MPI shell, according to an example.

FIG. 5 illustrates the tag matcher 330 in the MPI shell 120, according to an example. The tag matcher 330 matches send operations from a source process with receive requests from a destination process. As shown in FIG. 5, the tag matcher 330 includes two lookup tables: post receiving (post_recv) matching table 505 and unexpected message (unexpected_msg) matching table 510. The post_recv matching table 505 is used to store receive requests from the local host that cannot find any matched element in the unexpected_msg table 510, while the unexpected_msg matching table 510 stores an arriving message from a sender that cannot find any matched entry in the post_recv matching table 505. The tables 505 and 510 can be implement with hashing, tri-based methods, TCAM, and other range searching techniques.

The inputs of the tag matcher 330 are receive requests (recv_req), from the host, metadata$_{pc}$ and packets. If a packet is the first segment of a message from a sender, then metadata$_{pc}$ contains a message header that has <rank$_{src}$, rank$_{dst}$, context_id, tag>. The outputs of the tag matcher 330 includes packets, memory allocation request (alloc_req$_{pr}$), address update request (addr_ud$_{um}$) and multiple address lookup requests (addr_lp$_{pr}$, addr_lp$_{non\_hdr}$ and addr_lp$_{um}$).

The addr_lp$_{pr}$ signal indicates that packets of a target message from a sender arrived after the host has posted its corresponding receive request, recv_req. Moreover, the addr_lp$_{pr}$ signal indicates there exists an entry in the post_recv matching table for those packets.

The addr_lp$_{um}$ signal indicates that a receive request posted by the host arrived after the tag matcher 330 has recorded the corresponding message in the unexpected_msg matching table 510.

The addr_lp$_{non\_hdr}$ signal is used to request a memory location for consecutive packets of a message from a sender, which does not contain any message header information in its payload. This signal includes <rank$_{src}$, rank$_{dst}$, tag, payload length (payload_len), packet sequence number (pkt_seq)>.

The alloc_req$_{pr}$ signal indicates when a packet of a target message from a sender arrives before the host posts a receive request and it is required to allocate memory space to store the unexpected message. This signal includes <rank$_{src}$, rank$_{dst}$, tag, message length (mlen), packet sequence number (pkt_seq)>.

The addr_ud$_{um}$ signal is a receive request that includes <rank$_{src}$, rank$_{dst}$, tag, an address allocated by the host (addr), mlen>. This signal is posted from the host that cannot be found in either the unexpected_msg matching table 510 or the post_recv matching table 505. This signal informs the address translator in the MPI shell (e.g., the address translator 325 in FIG. 3) of the memory address/space allocated by the host for this receive request.

When receiving a packet from the packet classifier, the tag matcher 330 performs a lookup in the post_recv matching table 505 using the metadata$_{pc}$ to determine whether this is the first packet of an MPI message. A key (K$_{pr}$) of an entry in the post_recv table 505 includes <rank$_{src}$, rank$_{dst}$, context_id, tag>. If the lookup results in a hit, then the corresponding entry is deleted from the post_recv table 505 and the tag matcher 330 issues an address lookup request, (addr_lp$_{pr}$) to the address translator in the MPI shell to acquire the memory location of this packet. Otherwise, the tag matcher 330 updates the unexpected_msg matching table 510 and issues a memory allocation request (alloc_req$_{pr}$) for this message to the address translator, since the tag matcher 330 was unable to find any match in the post_recv table 505. If the received packet does not contain a header of a message (e.g., is not the first packet in an MPI message), the tag matcher 330 issues an address lookup request (addr_lp$_{non\_hdr}$) to the address translator module to obtain the memory location of this packet.

MPI send operations from a sender are paired with MPI receive operations from a receiver. When a receiver invokes an MPI receive operation (MPI_recv), the host posts a receive request (recv_req) to the tag matcher 330. The receive request may contain <rank$_{src}$, rank$_{dst}$, context_id, tag, base_addr, mlen>, where base_addr is the base address of device memory allocated by the host for a message. The tag matcher 330 then extracts a key (K$_{um}$) which includes <rank$_{src}$, rank$_{dst}$, context_id, tag>, from the receive request and searches (performs a lookup in) the unexpected_msg matching table 510 to check whether there exists an unexpected message received. If the lookup is hit, the entry corresponding to the unexpected message is deleted from the unexpected_msg table 510 and the tag matcher 330 issues an address lookup request (addr_lp$_{um}$) to the address translator. Otherwise, the tag matcher 330 sends an address update request (addr_ud$_{um}$) to the address translator to update base address associated with the message. Because this is an unmatched receive request, the tag matcher 330 writes a new entry in the post_recv matching table 505 to include the received request.

Figure 6:
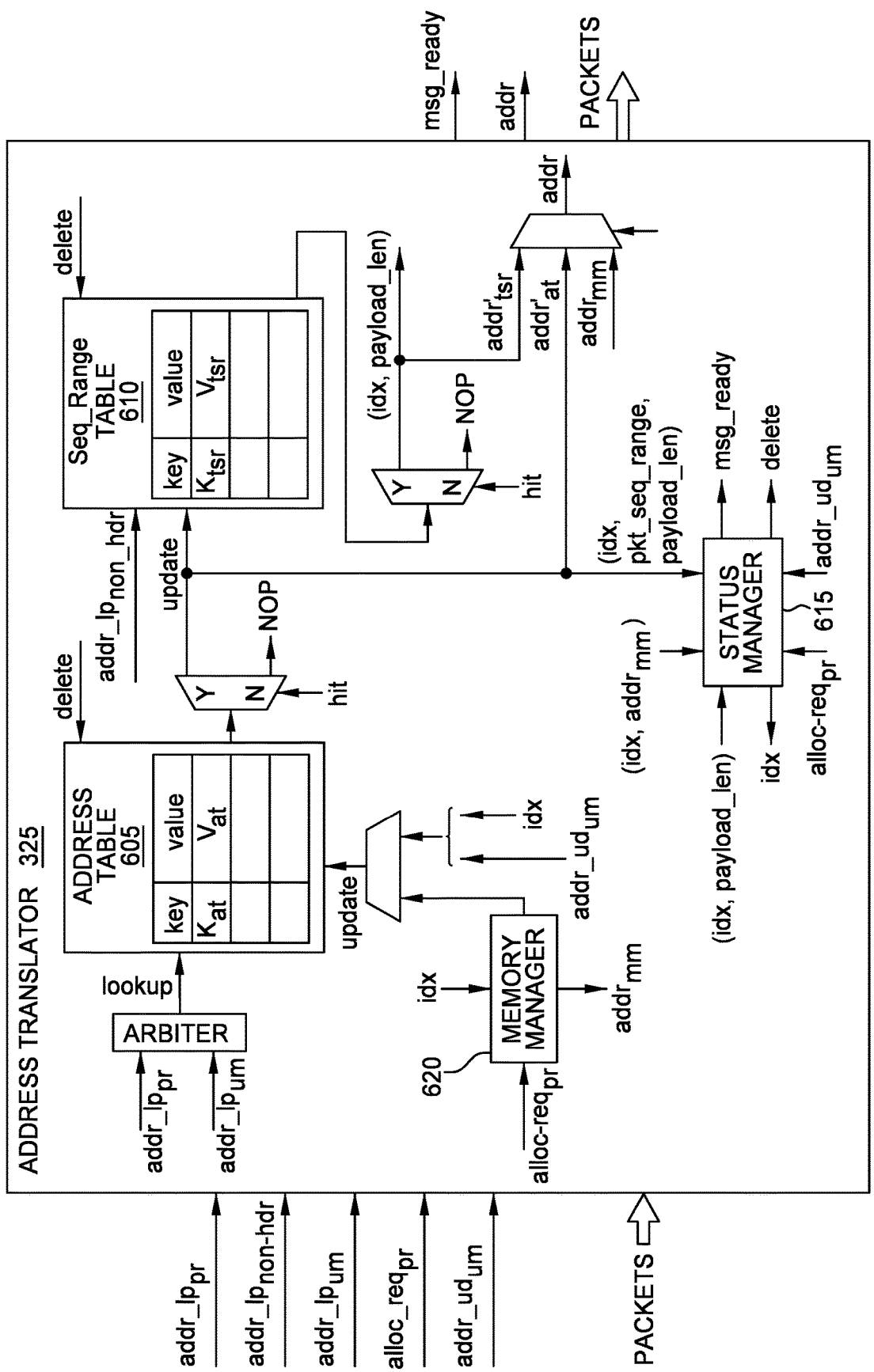
FIG. 6 illustrates an address translator in an MPI shell, according to an example.

FIG. 6 illustrates the address translator 325 in an MPI shell, according to an example. The address translator 325 is used to calculate the destination address in device memory for an incoming message packet and keep track of readiness of the message. The address translator 325 includes an address table 605, a sequence range (seq_range) table 610, a status manager 615, and a memory manager 620. Both tables 605, 610 are used to record memory addresses allocated for packets of target messages.

In one embodiment, each entry of the address table 605 contains a key (K$_{at}$) and a value (V$_{at}$) where K$_{at}$ has <rank$_{src}$, rank$_{dst}$, tag> and V$_{at}$ includes a base address (addr$_{at}$) allocated for a message, mlen, an index (idx) used to query status of message delivery, and a packet sequence number (pkt_base_seq) of the first packet of the MPI message containing the message header.

The seq_range table 610 has a similar key-value structure as the table 605. The differences are that in the seq_range table 610, a key (K$_{tsr}$) contains a field to describe packet sequence range (pkt_seq_range). The pkt_seq_range signal is a tuple containing (pkt_base_seq of the first packet of a message, pkt_base_seq mlen).

The address table 605 receives either addr_lp$_{pr}$ from the tag matcher 330 in FIG. 5 for a matched incoming packet of a message with the corresponding receive request posted, or addr_lp$_{um}$ for a matched receive request posted with the corresponding unexpected message arrived as inputs for lookup requests. If the lookup for addr_lp$_{pr}$ is hit, the address table 605 generates a key-value pair (K$_{tsr}$, V$_{tsr}$), with pkt_seq_range and writes it into the seq_range Table 610. Meanwhile, the address translator 325 updates the idx-th register in the status manager 615 with its pkt_seq_range and bytes received (payload_len), and calculates a new base memory address, addr'$_{at}$=(addr$_{at}$+pkt_seq−pkt_base_seq), where addr$_{at}$ and pkt_base_seq are from V$_{at}$, and pkt_seq is from addr_lp$_{pr}$. The calculated memory address (add'$_{at}$) is then sent to the data mover (shown in detail in FIG. 7) for storing the corresponding packets received.

In contrast, if the lookup for addr_lp$_{um}$ is hit, the address table 605 does not update the seq_range table 610 since the request is from a posted receive and its unexpected message has been received. In this scenario, the address table 605 only informs the idx-th register in the status manager 615 that the tag matcher has received a receive request from the host for this message. The address table 605 may support wildcard searching such as MPI_ANY_SOURCE and MPI_ANY_TAG and can be implemented with TCAM or STCAM.

The seq_range table 610 receives addr_lp$_{non\_hdr}$ (<rank$_{src}$, rank$_{dst}$, tag, payload_len, pkt_seq>) from the tag matcher for an incoming packet of a message that does not have a message header as input for lookup. Apart from rank$_{src}$, rank$_{dst}$, tag searching, the seq_range table 610 also conducts a range searching operation for an addr_lp$_{non\_hdr}$ request and checks whether its pkt_seq falls within pkt_seq_range of any entries. If the lookup is hit, the address table 605 calculates a new base memory address, addr'$_{tsr}$= (addr$_{tsr}$+pkt_seq−pkt_base_seq), where addr$_{tsr}$ and pkt_base_seq are from V$_{tsr}$, and pkt_seq is from addr_lp$_{non\_hdr}$. The calculated memory address, addr'$_{tsr}$, is then sent to the data mover for storing the corresponding received packets. In addition, the address translator 325 also updates the idx-th register in the status manager 615 with the number of bytes received (payload_len). The seq_range table 610 has wildcard and range searching requirements and can be implemented with TCAM.

The status manager 615 keeps track of a transmission status of each message. In one embodiment, the status manager 615 has a set of registers and a register allocator. The set of registers can record information such as <rank$_{src}$, rank$_{dst}$, tag, addr (address allocated either from the host or the memory manager 620), mlen, received bytes (recv_bytes), packet sequence range (pkt_seq_range), rr_recved> for a message, where rr_recved is a ready signal indicating that the tag matcher has received a receive request (recv_req) from the host for this message and the host is waiting for the message.

A register allocator may manage a pool of idle registers, allocate a new register from the idle pool for each allot_req$_{pr}$ or addr_ud$_{um}$ request and output a pointer (idx) to other components to access the register. When the idx-th register has recv_bytes equal to mlen and rr_recved is asserted high, this indicates that the corresponding message is completely received with a matched receive request found and ready for the host to read. The status manager 615 then generates a ready signal (msg_ready) containing <rank$_{src}$, rank$_{dst}$, tag, addr> to the data mover and issues a 'delete' signal to remove the corresponding entries in the address table 605 and seq_range table 610.

In one embodiment, the memory manager 620 allocates memory space for an incoming unexpected message and generates update requests for the address table 605. The memory manager 620 keeps track of allocated memory blocks and free memory space between them. The memory manager 620 can be implemented with various memory management algorithms such as fixed-size-block allocation, buddy memory allocation, and slab allocation. The memory manager 620 receives an alloc_req$_{pr}$ signal (<ranksrc, rankdst, tag, mlen, pkt_seq>) as its input and produces a physical memory address (addr$_{mm}$) allocated according to message length (mlen) from allot_req$_{pr}$. The allocated addr$_{mm}$ is then sent to the data mover for storing the corresponding packets received. The memory address is also recorded in the idx-th register in the status manager 615 via (idx, addr$_{mm}$) for message status query and update. Moreover, the memory manager 620 also generates an update request containing a key-value pair (K$_{at}$=<rank$_{src}$, rank$_{dst}$, tag>, V$_{at}$=<addr$_{mm}$, mlen, idx, pkt_seq>), and writes into the address table 605.

When receiving the addr_ud$_{um}$ signal from the tag matcher, the address translator 325 writes/updates an entry in the address table 605. The addr_ud$_{um}$ indicates that the host posts a new receive request and there does not exist any unexpected message matched with the posted receive request in the unexpected_msg table in the tag match. The addr_ud$_{um}$ signal includes <rank$_{src}$, rank$_{dst}$, tag, addr, mlen> as explained in the tag matcher. The base address (addr) in the addr_ud$_{um}$ signal is allocated by the host to store a dedicated message from the rank to the rank$_{dst}$ with the tag. An update request containing a key-value pair (K$_{at}$=<rank$_{src}$, rank$_{dst}$, tag>, V$_{at}$=<addr, mlen, idx, pkt_seq=none>), is then generated with addr_ud$_{um}$ and idx from the status manager 615, and written into the address table 605.

Figure 7:
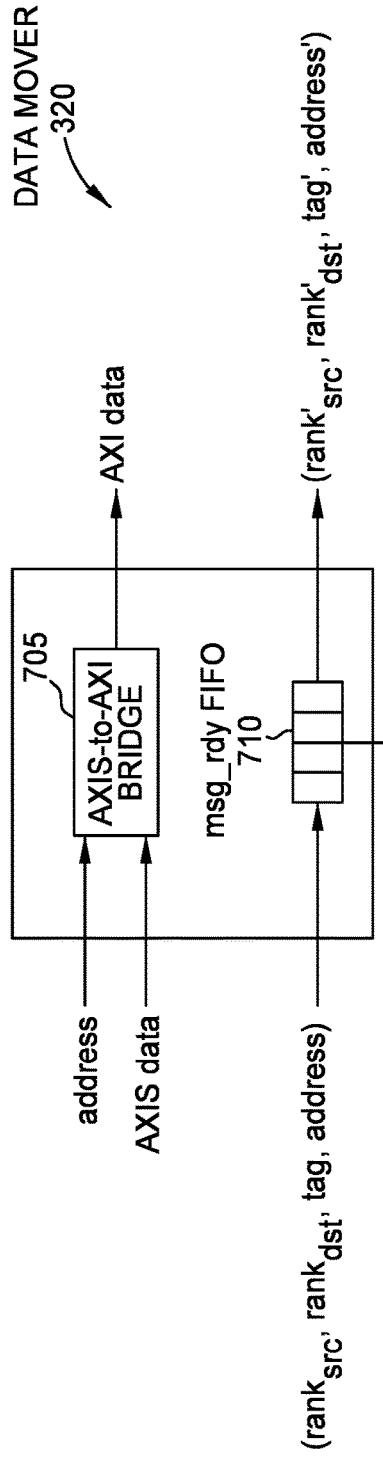
FIG. 7 illustrates a data mover in an MPI shell, according to an example.

FIG. 7 illustrates the data mover 320 in an MPI shell, according to an example. The Data Mover 320 includes an AXIS-to-AXI bridge 705 and a message ready (msg_rdy) FIFO 710. The AXIS-to-AXI bridge 705 converts packet data (e.g., AXIS_data) in the form of the AXI-Streaming protocol into data (e.g., AXI_data) in the form of the AXI protocol. Converted data is then written into device memory via the memory controller. The corresponding base address (address) of AXIS_data is obtained from the address translator shown in FIG. 6 and indicates its destination memory location in local memory in the SmartNIC.

The msg_rdy FIFO 710 stores the ready status of messages. These ready statuses may contain identifiers (rank$_{src}$ and rank$_{dst}$) of a source process and a destination process, tag, and its address in device memory, which indicates that a message is completely written into device memory and ready to be read. An empty signal of the msg_rdy FIFO 710 can be connected to either PCIe/host's interrupt system or pulling system via memory-mapped registers. If connected with an interrupt system, when the msg_rdy FIFO is not empty, the data mover 320 triggers the interrupt system and leaves the host to handle the interrupt accordingly. If connected with a pulling system, the data mover 320 writes a ready signal to a dedicated memory-mapped register when the msg_rdy FIFO 710 has stored elements. The host can periodically/constantly check the value of the dedicated memory-mapped register and handle the event accordingly.

Figure 8:
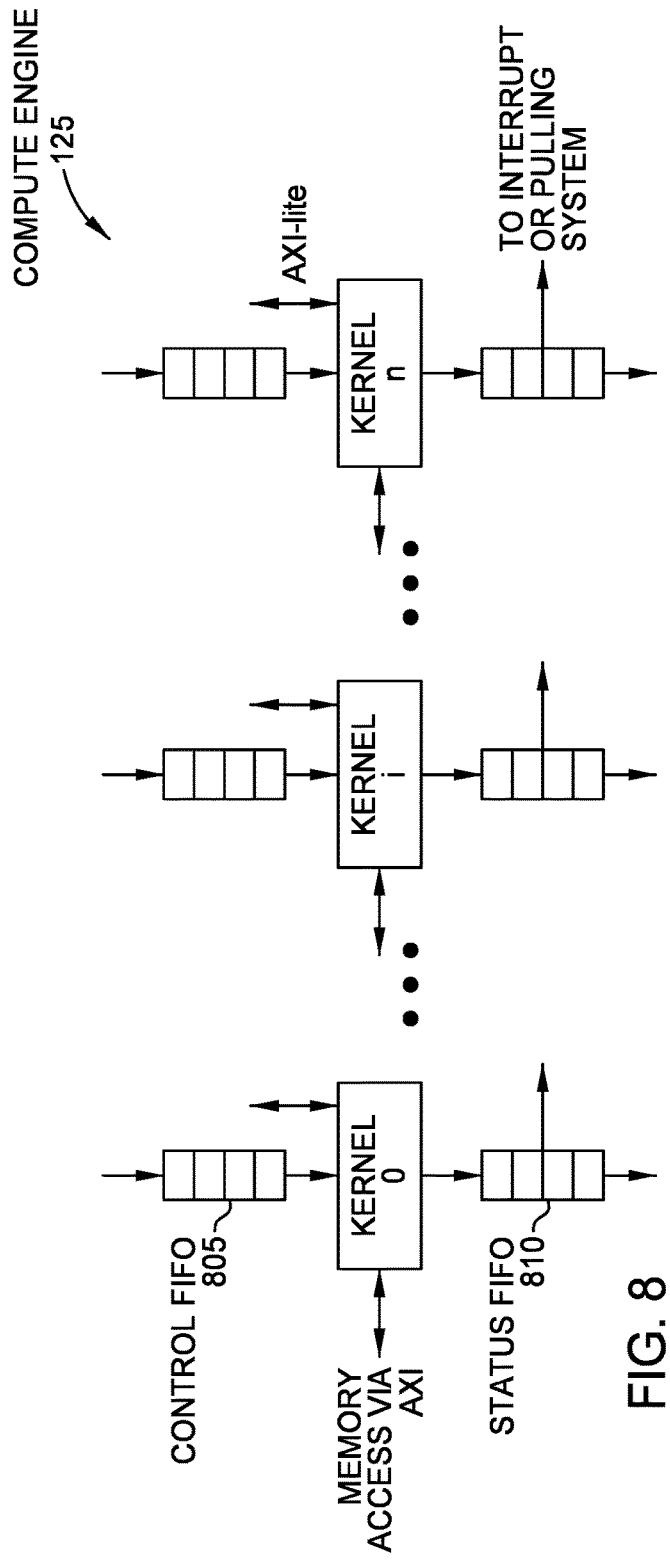
FIG. 8 illustrates a compute engine in an MPI shell, according to an example.

FIG. 8 illustrates a compute engine 800 in an MPI shell, according to an example. In this example, the compute engine 800 accommodates multiple kernels (Kernels 0-n) which may form one or more hardware accelerators. Each kernel includes a control FIFO 805 and a status FIFO 810. The control FIFO 805 receives control messages from the host. These control message may contain <unique ID of a workload, number of address arguments (N), address of argument 0, address of argument 1, . . . , address of argument N>. To start a kernel with a workload, the host can issue a control message to the control FIFO 805 via the AXI-Lite interface. Once the control FIFO 805 has elements inside, the kernel can take a control message from the FIFO 805 and start execution. With base addresses provided by the control message, the kernel can read data stored inside device memory with the AXI interface. A kernel can support multiple AXI interfaces to increase its memory access bandwidth. A kernel can also have memory-mapped registers which are accessible to the host via the AXI-Lite interface.

When a kernel finishes execution, the kernel writes a complete signal to its status FIFO 810, An empty signal of a status FIFO can be connected to either PCIe/host's interrupt system or pulling system via memory-mapped registers. For a design with an interrupt system, when a status FIFO 810 is not empty, the kernel triggers the interrupt system and leaves the host to handle the interrupt accordingly. For a design with a pulling system, the kernel writes a complete signal to a dedicated memory-mapped register when a status FIFO has elements. The host can periodically or constantly check the value of the dedicated memory-mapped register and handle the event accordingly once detecting a 'complete' status.

If the compute engine 800 is implemented using programmable logic, the kernels can be designed using either high-level synthesis (HLS) or register transfer level (RTL) coding. However, in another embodiment, the compute engine 800 may be implemented in hardened circuitry, such as an ASIC or SoC.

Figure 9:
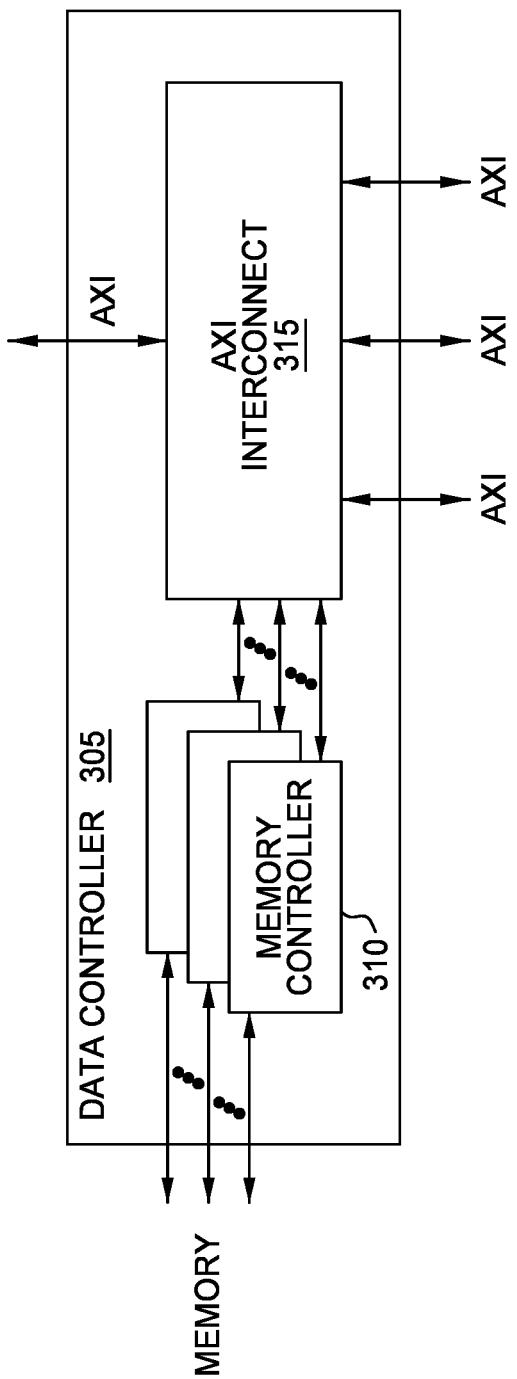
FIG. 9 illustrates a data controller in an MPI shell, according to an example.

FIG. 9 illustrates the data controller 305 in an MPI shell, according to an example. The data controller 305 provides memory access channels for various connected modules/components. The data controller 305 includes an AXI interconnect 315 and one or multiple memory controllers 310 (multiple ones are shown in this example). The memory controller 310 accesses device memory in the SmartNIC, Modules and components, including the data mover and the compute engine, the connected host and sending logic of a SmartNIC or a transport-layer offloading engine may share memory controllers for memory access via the AXI Interconnect 315 leveraging the AXI protocol. The AXI interconnect 315 serves as an interface between the MPI shell and the host (e.g., CPU).

Communication between the host and the hardware accelerator(s) includes interrupt or pulling operations on the host when a message is ready (explained in FIG. 7 with the data mover 320), control messages from the host to start accelerators, and interrupt or pulling operations on the host when an accelerator finishes its execution (mentioned in FIG. 8 with the compute engine 125).

Further, control register access is used to configure or read memory-mapped registers in the MPI shell for scalar arguments in accelerators, error information, or collecting statistics such as number of messages received, number of messages dropped, number of accelerators available, and types of accelerators supported.

Moreover, collective operations such as MPI_bcast, MPI gather, MPI_scatter, and MPI reduce are all based on operations in MPI_send and MPI_recv. A system with the MPI shell can also support these collective operations without any changes. Further, reduce-related operations such as MPI_reduce and MPI_allreduce contain compute operations such as MPI_max, MPI_min, MPI_sum, MPI_and, and MPI_or. These predefined compute operations can be implemented in the accelerator in the MPI shell.

Figure 10A:
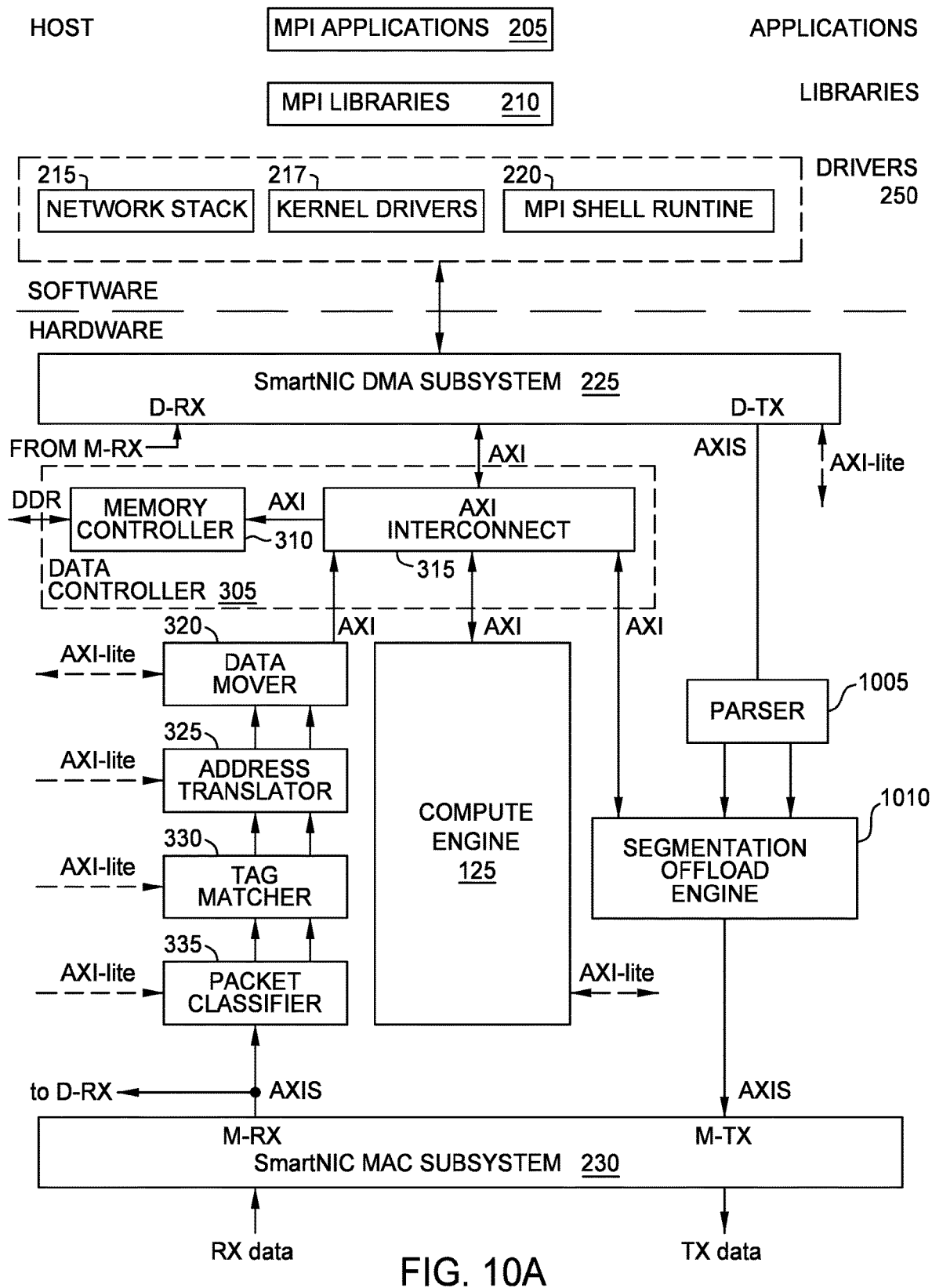
FIGS. 10A-C illustrate integrating an MPI shell into different SmartNIC implementations, according to an example.
Figure 10B:
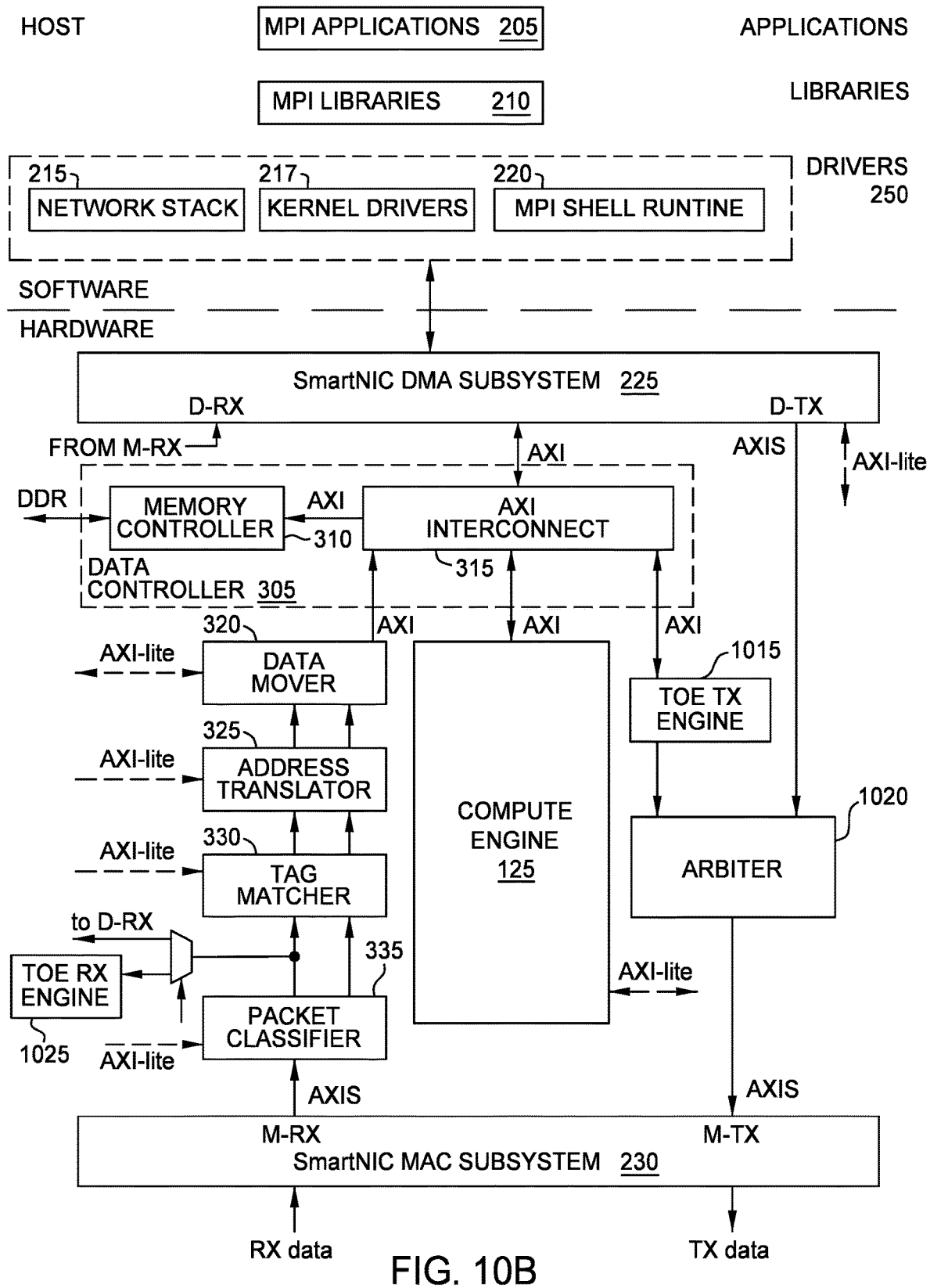
Figure 10C:
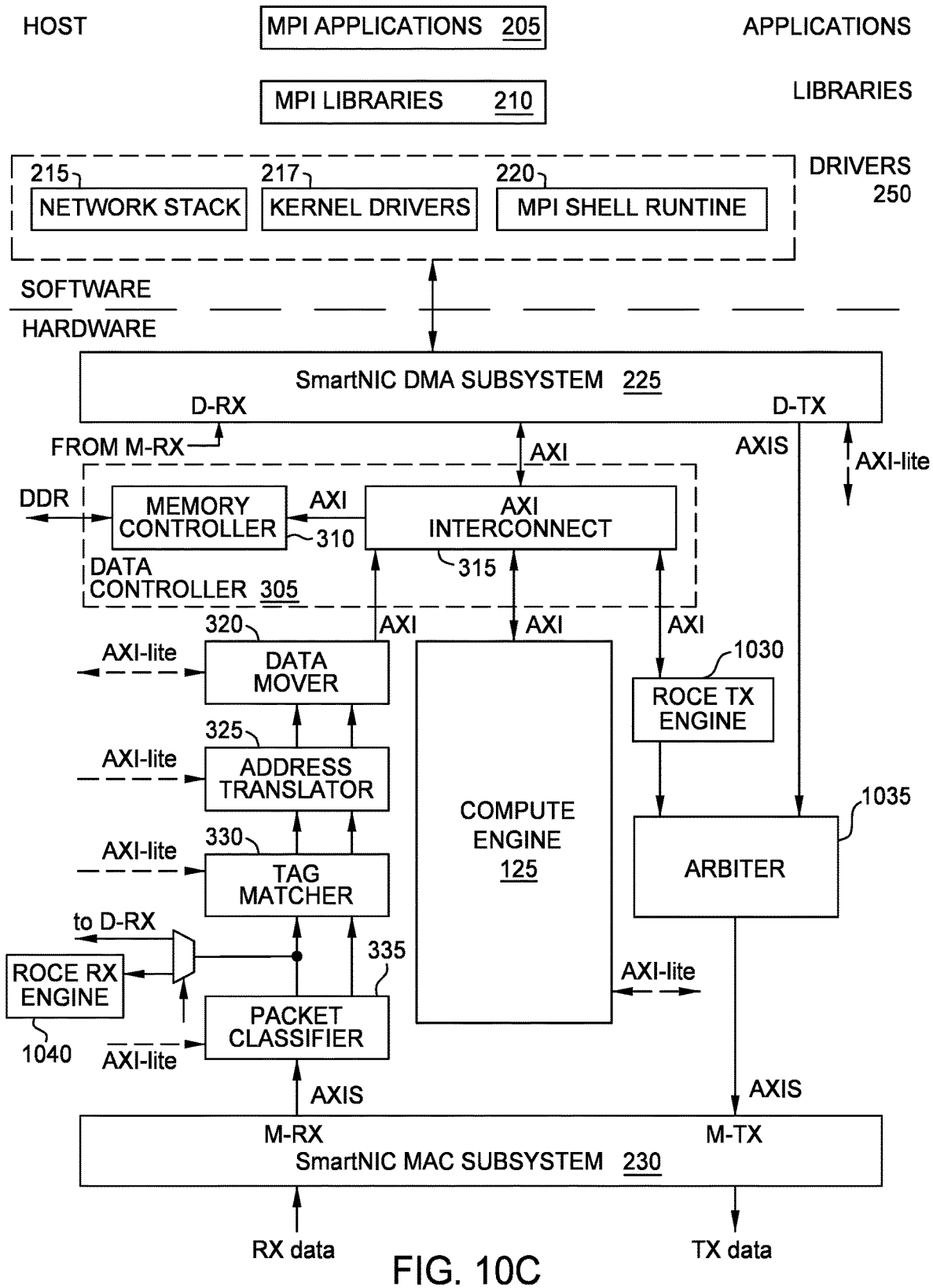

FIGS. 10A-C illustrate integrating an MPI shell into different SmartNIC implementations, according to an example. A node in a network-centric data center typically includes a host with multi-core CPUs and a device serving as a SmartNIC connecting to the network. The device can be either an ASIC (Application Specific Integrated Circuit) SmartNIC or a programmable SmartNIC. The MPI Shell, which served as a sniffer, can be integrated with various SmartNIC systems. FIGS. 10A-C show three examples of MPI Shell integration in a programmable SmartNIC.

The first example in FIG. 10A depicts a system architecture with the MPI shell integrated into a basic SmartNIC. The communication channel used in this example is the TCP/IP protocol. The system leverages its host for TCP/IP control such as TCP connection, retransmission, congestion control, TCP send and TCP ACK in the SmartNIC. More specifically, the host in this system takes charge of MPI libraries, networking stacks such as TCP/IP, kernel drivers to control its SmartNIC connected and MPI Shell Runtime. The MPI libraries 210 contain various functions such as MPI process management, point-to-point messaging control, collective operations, and synchronization. The MPI shell serves as a sniffer without breaking existing network flows and processes only packets from targeted messages that will be sent to the compute engine 125.

Packets received from the network (M-RX) can be redirected to the receive path (D-RX) in the SmartNIC MAC subsystem 230 before reaching the packet classifier 335. For messages sent to hardware processes (i.e., the compute engine 125), the MPI shell relies on the host to acknowledge all the TCP packets received.

For send operations, if message data resides in the device memory, the host (1) constructs a message with a header, address of message data, and dummy data, and (2) sends the message via a normal TCP send operation. A parser 1005 detects this kind of message. The parser 1005 then triggers a segmentation offload engine 1010 to read data from the device memory for sending actual message packets.

FIG. 10B illustrates a system architecture with the MPI shell integrated into a SmartNIC that has a TCP offloading engine (TOE). The integration is similar to that of FIG. 10A. This system maintains two sets of TCP management: one uses the traditional CPU-based TCP/IP stack for software processes, the other one leverages the TOE for hardware processes.

Packets received from the network (M-RX) are redirected to either the host via D-RX or to a TOE receive (TOE RX) engine 1025 according to results generated by the packet classifier 335. For send operations, a TOE transmission (TOE TX) engine 1015 can read message data from the device memory and send it out to remote peers via an arbiter 1020.

FIG. 10C illustrates a system architecture with the MPI shell integrated into a SmartNIC that has a RoCE RX engine 1040, RoCE TX engine 1030, and an arbiter 1035. The connection is very similar to that in FIGS. 10A and 10B, and thus, is not described in detail.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s), in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network interface card (NIC), comprising:
a Message Passing Interface (MPI) shell comprising circuitry configured to:
receive a plurality of packets corresponding to an MPI message;
process the plurality of packets to reconstruct the MPI message; and
forward data contained in the MPI message to compute circuitry for processing without first copying the data contained in the MPI message into a memory corresponding to a central processing unit (CPU), wherein the CPU is disposed in a same compute node as the NIC, the compute circuitry is disposed in the NIC, and the compute circuitry comprises one or more user-defined hardware accelerators,
wherein the MPI shell further comprises:
a tag matcher configured to receive the plurality of packets corresponding to the MPI message as input and generate address lookup requests; and
an address translator configured to receive the address lookup requests from the tag matcher and generate addresses allocated either from the CPU or a memory manager disposed in the address translator.

2. The NIC of claim 1, wherein the compute circuitry and the MPI shell are disposed on a same integrated circuit in the NIC.

3. The NIC of claim 1, wherein the MPI shell is configured to perform tag matching and address translation for the data contained in the MPI message without CPU involvement.

4. The NIC of claim 1, wherein the MPI shell further comprises:
a packet classifier configured to sniff the plurality of packets received from a network to identify the MPI message and generate metadata for the plurality of packets corresponding to the MPI message, wherein the metadata contains information used by the tag matcher to generate the address lookups.

5. The NIC of claim 4, wherein the MPI shell further comprises:
a data mover configured to receive the addresses from the address translator and store the data in the MPI message at the addresses in a target memory shared with the compute circuitry.

6. The NIC of claim 5, wherein the MPI shell further comprises:
a data controller comprising a memory controller coupled to a local memory and an interconnect, wherein the data controller is coupled to an output of the data mover, and wherein the interconnect serves as an interface between the MPI shell and the CPU.

7. A NIC, comprising:
hardware compute circuitry; and
an MPI shell comprising circuitry configured to:
receive a plurality of packets corresponding to an MPI message;
process the plurality of packets to reconstruct the MPI message;
forward data contained in the MPI message to the compute circuitry for processing; and
receive instructions from a CPU external to the NIC that instruct the compute circuitry to process the data contained in the MPI message, wherein the hardware compute circuitry comprises one or more user-defined hardware accelerators,
wherein the MPI shell further comprises:
a tag matcher configured to receive the plurality of packets corresponding to the MPI message as input and generate address lookup requests; and
an address translator configured to receive the address lookup requests from the tag matcher and generate addresses allocated either from the CPU or a memory manager disposed in the address translator.

8. The NIC of claim 7, wherein the compute circuitry and the MPI shell are disposed on a same integrated circuit in the NIC.

9. The NIC of claim 7, wherein the MPI shell is configured to perform tag matching and address translation for the data contained in the MPI message without CPU involvement.

10. The NIC of claim 7, wherein the MPI shell further comprises:
a packet classifier configured to sniff the plurality of packets received from a network to identify the MPI message and generate metadata for the plurality of packets corresponding to the MPI message, wherein the metadata contains information used by the tag matcher to generate the address lookups.

11. The NIC of claim 10, wherein the MPI shell further comprises:
a data mover configured to receive the addresses from the address translator and store the data contained in the MPI message at the addresses in a target memory shared with the compute circuitry.

12. The NIC of claim 11, wherein the MPI shell further comprises:
a data controller comprising a memory controller coupled to a local memory and an interconnect, wherein the data controller is coupled to an output of the data mover, and wherein the interconnect serves as an interface between the MPI shell and the CPU.

13. A NIC, comprising:
an interface shell comprising circuitry configured to:
receive a plurality of packets corresponding to a message in a distributed compute system where tasks are transmitted between nodes in the distributed compute system using messages;
process the plurality of packets to reconstruct the message; and
forward data contained in the message to hardware compute circuitry for processing without first copying the data contained in the message into a memory corresponding to a central processing unit (CPU), wherein the CPU is disposed in a same compute node as the NIC, the compute circuitry is disposed in the NIC, and the compute circuitry comprises one or more user-defined hardware accelerators,
wherein the interface shell further comprises:
a tag matcher configured to receive the plurality of packets corresponding to the message as input and generate address lookup requests; and
an address translator configured to receive the address lookup requests from the tag matcher and generate addresses allocated either from the CPU or a memory manager disposed in the address translator.

14. The NIC of claim 13, wherein the compute circuitry and the interface shell are disposed on a same integrated circuit in the NIC.

15. The NIC of claim 13, wherein the interface shell is configured to perform tag matching and address translation for the data contained in the message without CPU involvement.

16. The NIC of claim 13, wherein the interface shell is configured to receive instructions from the CPU that instruct the compute circuitry to process the data contained in the message.

* * * * *